(12) United States Patent
Rahimzadeh et al.

(10) Patent No.: US 6,408,887 B2
(45) Date of Patent: Jun. 25, 2002

(54) DUAL SIZE PLUMBING END CAP

(76) Inventors: Rick Rahimzadeh, 6246 Sale Ave., Woodland Hills, CA (US) 91367; John Hanna, 155 Cathy Dr., Newberry Park, CA (US) 91320

( * ) Notice: Subject to any disclaimer, the term of this patent is extended or adjusted under 35 U.S.C. 154(b) by 0 days.

(21) Appl. No.: 09/836,007

(22) Filed: Apr. 17, 2001

Related U.S. Application Data

(60) Provisional application No. 60/198,136, filed on Apr. 17, 2000.

(51) Int. Cl.$^7$ ................................................ F16L 55/10
(52) U.S. Cl. .................... 138/96 R; 138/96 T; 138/98; 220/287
(58) Field of Search .................... 138/96 R, 96 T, 138/89; 285/148.23; 220/287

(56) References Cited

U.S. PATENT DOCUMENTS

| | | | | |
|---|---|---|---|---|
| 528,167 A | * | 10/1894 | Jones | 287/108 |
| 2,525,162 A | * | 10/1950 | Wise | 220/287 X |
| 2,873,765 A | | 2/1959 | Gregory | 138/96 |
| 3,610,288 A | * | 10/1971 | Carr | 138/96 R |
| 3,655,089 A | * | 4/1972 | Tower | 220/287 X |
| 3,680,896 A | * | 8/1972 | Cupit | 285/177 |
| 3,726,320 A | * | 4/1973 | Lachenmayer | 138/96 R X |
| 3,807,457 A | * | 4/1974 | Logsdon | 138/89 |
| 3,850,459 A | * | 11/1974 | Blumenkranz et al. | 285/156 |
| 4,146,058 A | * | 3/1979 | Bercovitz | 138/96 R |
| 4,153,130 A | * | 5/1979 | Hacker | 220/287 X |
| 4,342,337 A | | 8/1982 | Underwood | 138/96 T |
| 4,712,812 A | * | 12/1987 | Weir, III | 138/96 T X |
| 5,081,914 A | | 1/1992 | Mejia | 138/89 X |
| 5,425,593 A | * | 6/1995 | Buehler | 403/305 |
| 5,915,418 A | | 6/1999 | Turner | 138/96 R X |
| 5,954,094 A | * | 9/1999 | Base | 138/96 R X |
| 5,954,957 A | * | 9/1999 | Chin-Loy et al. | 210/232 |

* cited by examiner

*Primary Examiner*—Patrick Brinson
(74) *Attorney, Agent, or Firm*—Kelly Bauersfeld Lowry & Kelley, LLP

(57) ABSTRACT

A dual size plumbing end cap is disclosed which capable of sealing the end of two sizes of pipe includes a fluid impervious membrane having a first cylindrical wall extending therefrom and configured to envelop an end of a pipe having a first diameter and, cooperatively with the membrane, seal the end of the pipe. A second cylindrical wall is associated with the membrane and has a diameter which is larger than the first wall. The second wall is configured to envelop an end of a second pipe having a second diameter and, cooperatively with membrane, seal the end of the second pipe. The end cap may include a test fitting which extends through the membrane and is configured to securely connect to a test gauge, air source, or water source.

30 Claims, 5 Drawing Sheets

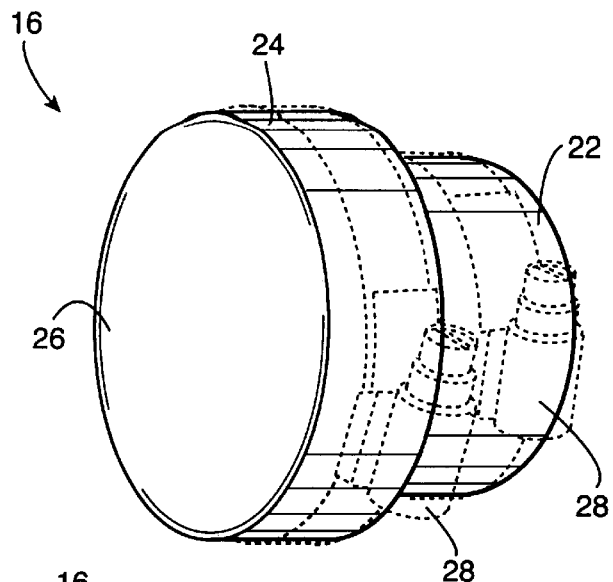
FIG. 10
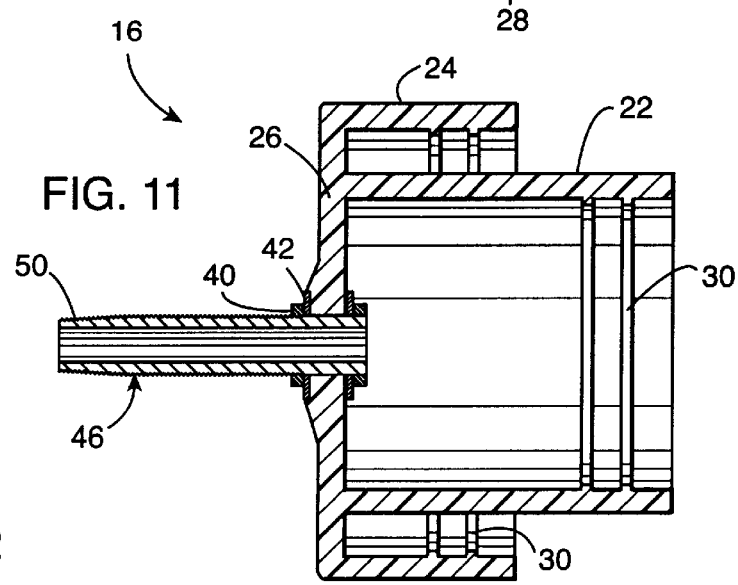
FIG. 11
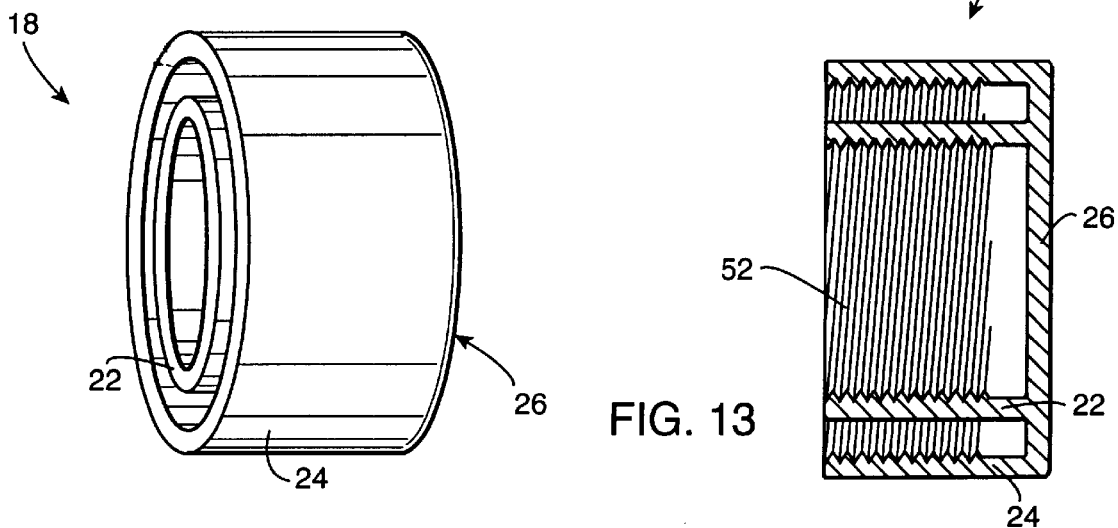
FIG. 12
FIG. 13

DUAL SIZE PLUMBING END CAP

RELATED APPLICATION

This application claims priority from provisional application Ser. No. 60/198,136, filed Apr. 17, 2000.

BACKGROUND OF THE INVENTION

The present invention relates generally to closures for threaded and unthreaded piping and cylindrical members. More particularly, the present invention is a dual-size cap which is comprised of piping materials approved for use by current plumbing codes and standard practices to cap a single pipe end, but capable of accommodating two different pipe sizes.

There are many instances in construction, as well as by service technicians and homeowners to temporarily or permanently cap a pipe. In some instances the pipe has not yet been exposed, such as a water service or sewer line below grade, or beneath a home. This would be an instance where a service technician would be better equipped to handle the job without making an extra trip to the hardware store or supply house after the pipe is exposed.

Generally, the ends of pipes are capped in accordance to the type of piping material it is capping. Copper tubing ends are generally capped using a solder welded copper cap. Plastic pipe ends are generally closed with a solvent weld plastic cap. Plain and threaded end piping may be capped using an elastomeric material, which is slipped over the pipe end and sealed with a clamping device.

The purpose of capping pipe ends is numerous. For example, in plumbing residential and commercial structures, a series of plumbing systems are installed. There are separate systems for waste and waste vents, hot and cold potable water, natural or liquid gas, landscaping water, roof and storm water drainage and fire sprinkler water, to name the most common. After each stage of installation of these systems is completed, they must be tested and approved by local building authorities. The ends of all piping outlets must be temporarily capped and sealed to allow pressure to be applied to these systems, generally by the use of water or air, to expose possible installation and or material defects. After successful completion of the tests, the systems are drained, the caps are removed and the next stage of installation is resumed. This process is repeated until the project is completed.

With the multitude of plumbing systems comes a multitude of pipe sizes. Each plumbing system has several pipe sizes which are determined by load calculations set forth by plumbing engineers and plumbing codes. Unfortunately, the trade person must carry a number of cap sizes to complete the testing of all these systems. For example, in a small three bathroom residence there are generally four common pipe sizes for the waste and vent system, 1½", 2", 3" and 4". There are generally four common sizes for the water system, ½", ¾", 1" 1¼", There are generally five common pipe sizes for the gas system, ½", ¾", 1" 1¼" and 1½" and there are generally three common pipe sizes for landscape water, ½", ¾", 1". Generally each plumbing system uses a different piping material and installation method.

The diverse amount of material required by the trade person to complete a small project is staggering. Testing for a small project described above requires approximately ten to twenty caps, varying in size, whereas a commercial building such as a medical facility or a hotel requires hundreds of caps. The pipe sizes in a commercial building increase as the demand on the systems increase. Their pipe sizes may generally range from 1½" through 8" for waste and vent systems, ½" through 6" for potable water systems, ½" through 3" for gas systems and 2" through 8" for the storm water system. Capping products are typically used numerous times before discarding, resulting in an accumulation in the service vehicle or warehouse.

Accordingly, there is a need for a plumbing end cap which is capable of capping pipes of two different sizes. Such a cap should be configured to be used on a variety of ends of pipes, and capable of being constructed of various types of materials. The present invention fulfills this need and provides other related advantages.

SUMMARY OF THE INVENTION

The plumbing end cap of the present invention can be used as a temporary or permanent cap to terminate pipe ends. The plumbing end cap generally comprises a fluid impervious membrane, having a first cylindrical wall extending therefrom. The first wall is configured to envelop an end of a first pipe having a first diameter and, cooperatively with the membrane, seal the end of the first pipe. A second cylindrical wall is associated with the membrane and has a diameter which is larger than the first wall. The second wall is configured to envelop an end of a second pipe having a second diameter and, cooperatively with the membrane, seal the end of the second pipe.

The plumbing end cap may include a test fitting extending through the membrane. The test fitting includes external or internal threads so as to be configured to securely connect to a test gauge, or water source.

The first and second walls may be comprised of a relatively durable material, such as hardened plastic or metal. Inner surfaces of the first and second walls may include internal threads which are configured to mate with external threads of the first or second pipe which the end cap is to be attached to. The inner surfaces of the walls may alternatively include protruding ridges which are configured to secure the walls to an end of the first or second pipe.

The first and second walls may alternatively be comprised of a flexible material. In such an embodiment, a clamp surrounds an outer surface of the first or second wall to secure it to the first or second pipe end. Prongs may extend from an outer surface of either the first or second wall for positioning the clamp.

The plumbing end cap of the present invention can be designed with varying configurations. For example, the first and second may extend from opposite surfaces of the membrane. Alternatively, the first and second walls may extend from the same surface of the membrane, so as to be concentric. In such instance, the first wall is often of greater length than the second wall. In yet another embodiment, a wall extends from the member in stepped fashion to define a first cylindrical wall, and second cylindrical wall of greater diameter. The first cylindrical wall is configured to accept an end of a first pipe, while the second wall is configured to accept an end of a second pipe having a different diameter. Regardless of the configuration, the plumbing end cap of the present invention is designed to permanently or temporarily seal two different pipe sizes.

In the case of the homeowner, the plumbing end cap of the present invention is of great assistance. Many pipe sizes are very similar making it difficult for the homeowner to determine the proper cap to purchase. Often the pipe can not be removed as a reference of size, so the homeowner is left with a choice of either purchasing two or three caps, or purchasing one cap and possibly making return trips to the store. A novel plumbing end cap with two pipe sizes in ascending order would take all the guesswork out of the purchase. For example, if a homeowner had a water line in the ground, which is no longer in use and wanted to terminate the line, he would expose the pipe and try to determine its size. For example, if the pipe is ½" steel threaded pipe, the homeowner would go to the hardware store and try to determine what he or she saw in the ground. By having one cap that is ½" and ¾", and another cap which is 1" and 1¼", the choice would be easy. The ½" and the 1" pipe sizes are substantially different.

The novel plumbing end cap of the present invention is also an attempt at lessening the amount of inventory required by the trade person to complete his or her job. The invention allows the trade person to order a single end cap, knowing it will have the ability to handle two pipe sizes. Because the invention covers only two pipe sizes, it remains inexpensive to the trade person and homeowner, and reduces overbuying and overstocking of caps. Furthermore, this invention could reduce the overall inventory of the wholesale supplier and the retailer by elimination inventory of individual size caps, replacing them with a dual size cap, when shelf storage space is limited.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 10 is another plumbing end cap embodying the present invention, and having clamps illustrated in phantom thereon;

FIG. 11 is a cross-sectional view of a plumbing end cap similar to FIG. 10, but having a test fitting associated therewith;

FIG. 12 is a perspective view of yet another plumbing end cap embodying the present invention;

FIG. 13 is a cross-sectional view of a plumbing end cap similar to FIG. 12, but having internal threads;

DETAILED DESCRIPTION OF THE PREFERRED EMBODIMENTS

Figure 1:
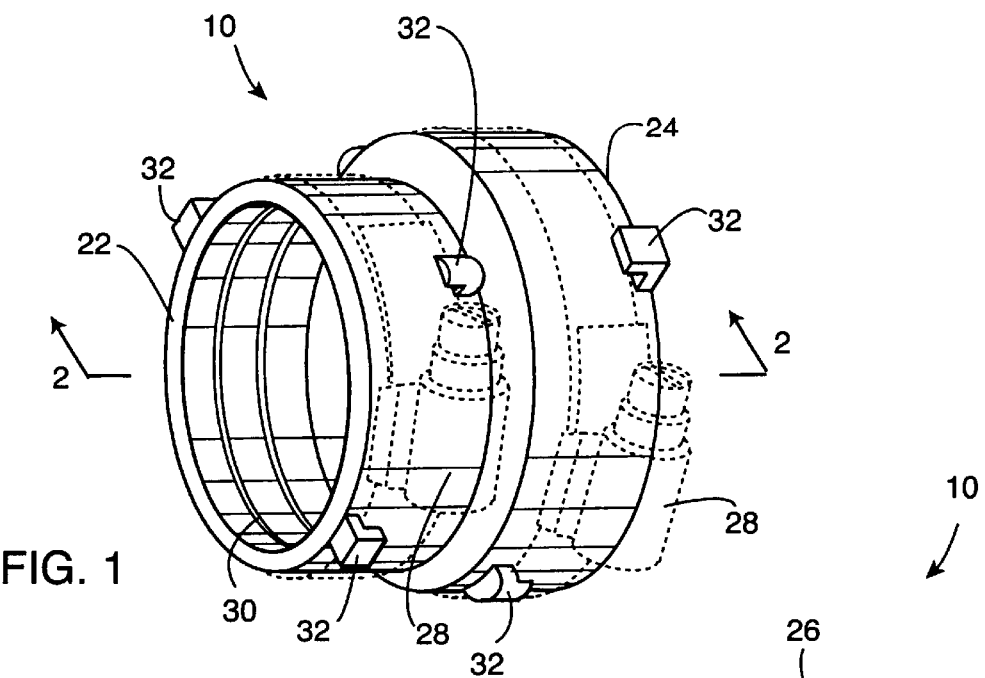
FIG. 1 is a perspective view of a plumbing end cap embodying the present invention and having clamps thereon shown in phantom.
Figure 2:
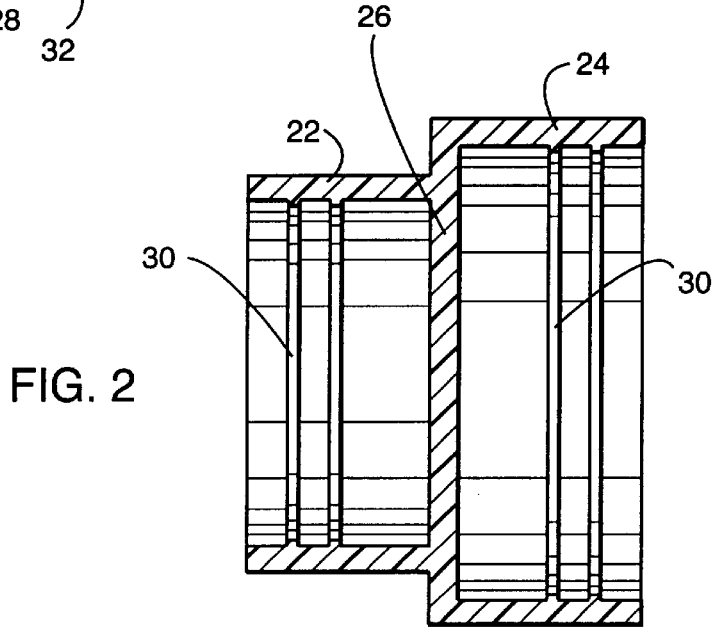
FIG. 2 is a cross-sectional view taken generally along line 2—2 of FIG. 1.
Figure 3:
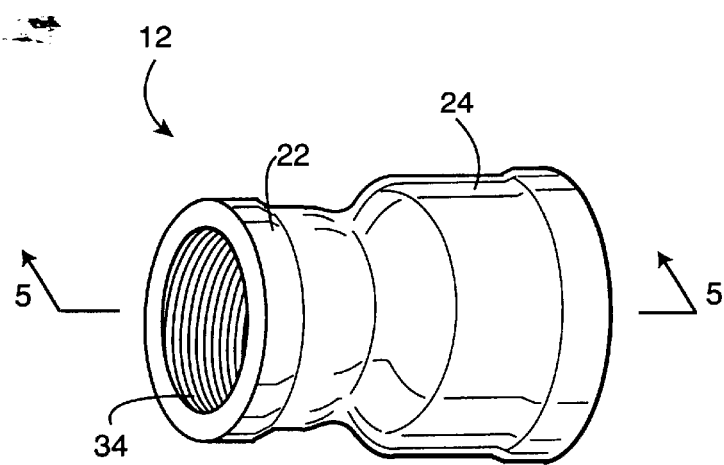
FIG. 3 is a perspective view of another embodiment of the present invention having internal threads.
Figure 4:
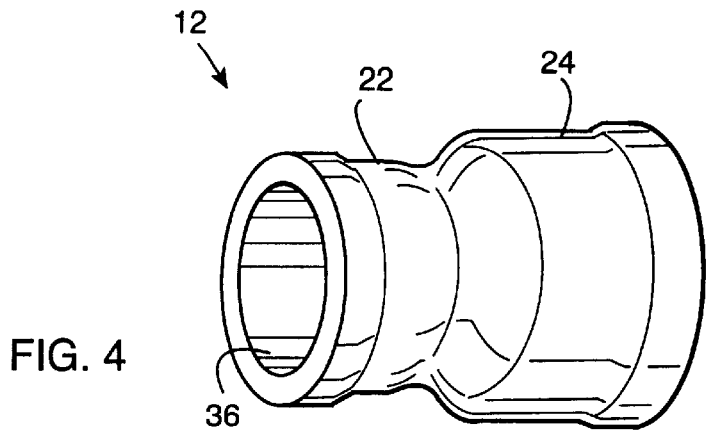
FIG. 4 is a perspective view of a plumbing end cap similar to FIG. 3, but having smooth inner surfaces.
Figure 5:
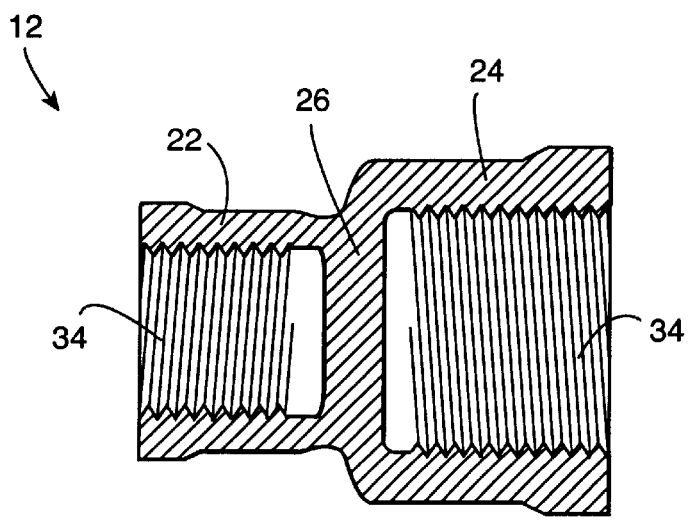
FIG. 5 is a cross-sectional view taken generally along line 5—5 of FIG. 3.

As illustrated in the accompanying drawings, the present invention is concerned with a dual size plumbing end cap, generally referred to by the reference number 10 in FIGS. 1 and 2, by the reference number 12 in FIGS. 3–5, by the reference number 14 in FIGS. 6–9, by the reference number 16 in FIGS. 10 and 11, by the reference number 18 in FIGS. 12 and 13, and by the reference number 20 in FIGS. 14–17.

In the following descriptions, like reference numbers refer to corresponding illustrations throughout several views and variations of the present invention. In the following descriptions, it is to be understood that such terms as "right, left, top, bottom, inside and outside" and the like are words of convenience and are not to be construed as limiting terms.

Caps 10–20 of the present invention have two specific pipe sizes per cap. Each dual sized cap 10–20 will generally, but not limited to be, in sequential order of current standard piping sizes used in construction, testing, maintenance and repairs of residential, commercial and industrial piping systems and equipment. The intended use of the dual size cap 10–20 is not to cap two pipe ends simultaneously, but is intended to cap an individual pipe end. Each dual sized cap 10–20 is designed to cap one pipe end per use. Depending upon the cap material, the cap 10–20 will be reusable for future applications. Each single bodied, dual cap 10–20 will be referred to by commonly used pipe sizes, such as 3" and 4". Each side of the cap 10–20 will be assigned a size that corresponds loosely to the actual size of the cap opening.

With reference to FIG. 1, a dual cap 10 is shown with a first wall 22 defining a cap of a first diameter on the left and a second wall 24 defining a larger diameter cap on the right. A smaller pipe would enter from the left and a larger pipe would enter from the right. The center portion of the cap 10 is a fluid impervious solid membrane 26 separating the two different cap sizes. This particular cap 10 is primarily constructed of a synthetic rubber material depressed to fit a smooth pipe end. On the exterior of the cylinder portion of the cap would be a commercially available worm drive type clamp 28, which would tighten the cap 10 against the outside wall of the pipe it is capping. Because there are only two pipe sizes in sequential order, the difference in the two diameters would be minimal, allowing only one clamp 28 to be used, which would accommodate both the larger and smaller pipe diameters. The clamp 28 would be moved to the proper position depending on the pipe size requiring capping. The cap 10 could also be offered with two clamps 28, one per each pipe size. The membrane 26 and the sides of the embodiment would be of the thickness to withstand the pressure the cap 10 is designed to hold.

With continuing reference to FIG. 1, the interior of the smaller cap 22 shows two ridges 30. The ridges 30 are again shown in FIG. 2, on the smaller and larger diameter caps 22 and 24. These ridges 30 are to assist in the holding strength of the cap 22 or 24 when withstanding excessive pressures which under normal operating and testing conditions, build up in plumbing systems and the like. The two ridges 30 located on the interior surface of each cap 22 or 24 are only an example of a rough interior surface meant to secure and seal the inserted pipe, and is not intended to limit the invention to other means of rough interior surfaces.

The exterior of each cap 22 and 24 has prongs 32 emanating from the body of the cap 10. These prongs 32 are useful in aligning the clamp 28 for tightening. They are also helpful for preventing the loose clamps 28 from being lost or separated from the cap 10 when not in use, during shipping, transport and storage.

With reference to FIGS. 3–5, a second embodiment of a dual cap 12 is shown having a first wall 22 defining a smaller diameter cap on the left and a second wall 24 defining a larger diameter cap on the right. The smaller pipe size would enter from the left and the larger diameter on the right. With reference to FIG. 3 and FIG. 5, this embodiment of a dual cap 12 has a tapered female threaded 34 interior to accept male tapered pipe threads. FIG. 5 clearly shows the center membrane 26 separating the sequential pipe sizes. This particular cap 12 is primarily constructed of steel, brass or plastic and can accommodate a variety of pipe threads depending upon its purpose. Threaded pipe and fittings are commonly used in plumbing systems to convey materials such as air, water, natural gas and liquid gas. For example, "Standard Iron Pipe Size, I.P.S." or "Compression Threads". An example of common size dual caps for I.P.S. would be ½" and ¾" or ¾" and 1" I.P.S. An example of common size dual caps for Compression Thread caps would be ⅛" and ¼" or 5/16" and ⅜" compression. All threads used for the present invention would comply with national and international thread specifications.

With reference to FIG. 4, the dual sized cap 12 can be designed with a smooth interior surface 36. The interior cap diameter walls 22 and 24 will be a continual cylindrical diameter from the entry point of the pipe to the center membrane 26, where the pipe would butt. A smaller diameter pipe would be inserted from the left and a larger diameter pipe would be inserted from the right. This particular cap 12 will be constructed of copper and a variety of plastics. These caps are primarily designed to accommodate solder or solvent weld piping, for example, welded copper pipe and glued plastic pipe. Copper tubing and plastic piping with soldered and glued joints is commonly used in plumbing systems to convey materials such as air water and waste. Standard copper tubing and plastic pipe sizes could vary depending on the system being served. Commonly used pipe sizes can vary from ⅝" through 12", depending on the system being served. Examples of dual cap sizes for FIG. 4 using copper tubing and plastic piping could be as small as ⅝" and ⅞", ½" and ¾", ¾" and 1", and as large as 8" and 10", 10" and 12". There are a number of very commonly used pipe sizes other than the example sizes. The sizes used in the example are not meant to be limiting, but is meant to be enlightening to the need of a dual sized cap.

Figure 6:
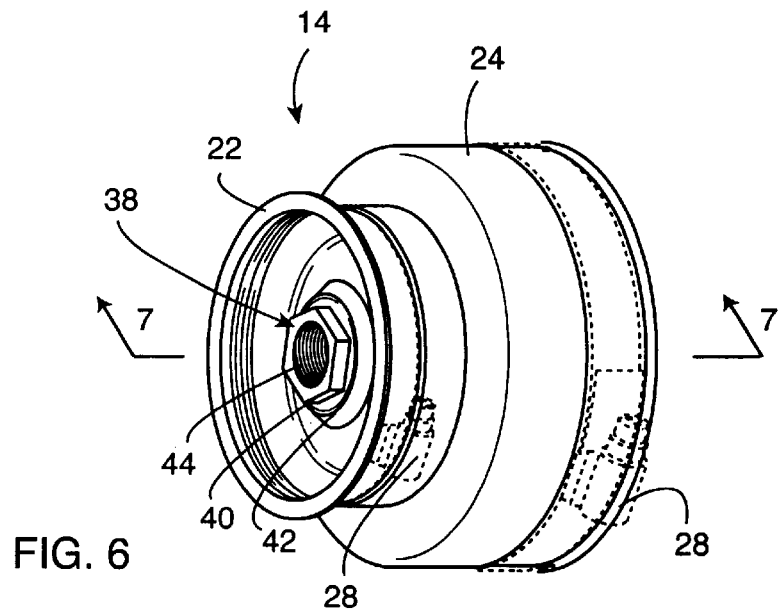
FIG. 6 is a perspective view of yet another embodiment of the present invention having a test fitting incorporated therein.
Figure 7:
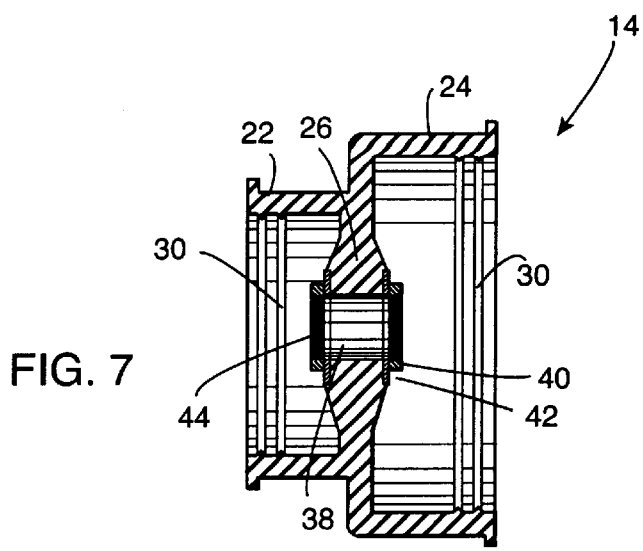
FIG. 7 is cross-sectional view taken generally along line 7—7 of FIG. 6.

With reference to FIG. 6, a dual cap 14 is shown with a first wall 22 defining a smaller diameter cap on the left and a second wall 24 defining a larger diameter cap on the right. The smaller pipe size would enter from the left and the larger pipe size from the right. The center membrane 26 would act as the stopping point for both diameter pipe ends. The material and fastener would be that of the embodiment described in FIG. 1. At the center of this membrane 26 would be a test fitting 38 preferably constructed, but not limited to, brass, metal or plastic. This fitting 38 would be molded into the membrane 26 and/or locked in place by the use of threads, lock nuts 40 and washers 42. This fitting 38 would have a standard tapered Female Iron Pipe Thread 44 (F.I.P.) pattern in the center. FIG. 7 illustrates the cross-sectional view of this embodiment which shows the fitting 38 locked in place. Both the smaller and the larger sized cap 22 and 24 of this embodiment would have a tapered F.I.P. thread facing outward, which would enable a standard tapered Male Iron pipe (M.I.P.) fitting or pipe thread to be screwed and sealed in place. The tapered M.I.P. pipe or fitting would be removable and interchangeable depending on the cap size being utilized.

For example, if a plumber was testing a drainage system of a residence containing the pipe sizes 1½", 2", 3" and 4" (pipe sizes commonly found in almost all homes constructed in the United States) the following sequence would occur. The plumber would cap all pipe ends on the system using single or dual end caps. He or she would then find the most convenient pipe end to fill the system from. If the pipe end chosen would be a 3" pipe, he or she would choose the 3"×4" dual cap 14 with test fitting 38, from their stock. The 3" cap 22 would be fastened to the pipe, exposing the unused 4" cap 24 with a tapered F.I.P. thread 44 facing outward. If the pipe end chosen was a 4" pipe, the same 3"×4" cap 14 with test fitting 38 would be chosen, and the 4" cap 24 would be fastened to the pipe, exposing the 3" unused cap 22 with a tapered F.I.P. thread 44 facing outward.

Depending on the testing procedure, most commonly water or air, the plumber would have several choices depending on his or her available stock. The choices would be, either screwing in a pipe with a water fitting, screwing in a pipe with an air fitting and test gauge or screwing in a water or air fitting manufactured with a tapered F.I.P. thread.

The primary purpose of this fitting 38 is to enable a plumber who is testing a plumbing system to fill and drain a plumbing system through this fitting 38. Any commercially available water hose bib, valve, air fitting or test gauge would be adaptable to the standard tapered F.I.P. thread 44 molded in this embodiment. Having the dual cap 14 with a fitting 38 would give the plumber a multitude of filling, draining, testing and capping possibilities with less inventory on their vehicle or job site. It would also allow the wholesalers, retailer and building centers to offer more capping options with better use of valuable shelf and storage space.

Figure 8:
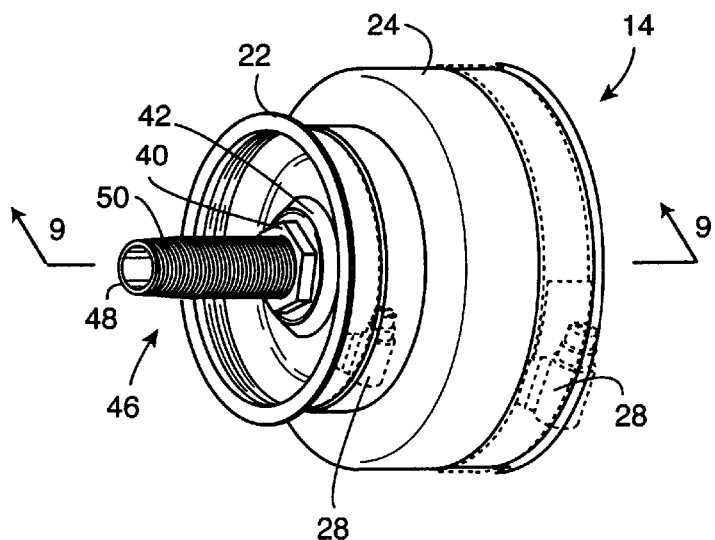
FIG. 8 is perspective view of another plumbing end cap embodying the present invention and having a test fitting incorporated therein.
Figure 9:
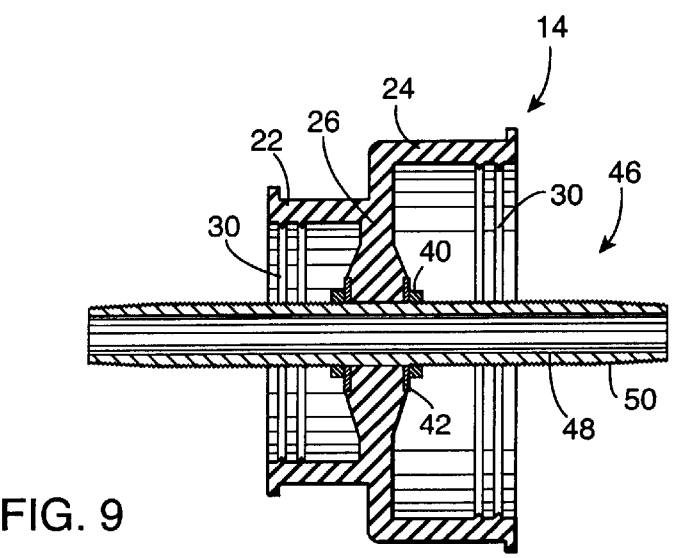
FIG. 9 is a cross-sectional view taken generally along line 9—9 of the FIG. 8.

With reference to FIGS. 8 and 9, an alternate embodiment to FIGS. 6 and 7 is illustrated. The alternate embodiment of FIG. 9 would have a fitting 46 preferably constructed, but not limited to, brass, metal or plastic. This fitting 46 would be molded and/or locked in place by the use of threads, lock nuts 40 and washers 42. The pipe 48 running through the center of the fitting 46 may be a single caste embodiment or a pipe with continual diameter threads 50 locked in place with lock nuts 40 and washers 42. At the ends of this pipe 48 would be standard tapered M.I.P. threads 50. The tapered M.I.P. thread 50 would protrude both ends of the cap 14. The plumber could then screw a commercially available water hose bib, valve, air fitting or test gauge to the tapered M.I.P. thread 50 for testing, filling and draining the system being served.

With reference to FIG. 10, this embodiment utilizes the same idea of the dual sized end caps 10–14 previously described, but in an alternate configuration. The left side of this illustration shows the outer bottom of the single membrane 26. This dual sized cap 16 includes a first cylindrical wall 22 extending from the membrane 26. A second cylindrical wall 24 of greater diameter extends from the membrane 26, typically at the periphery thereof, on the same side of the membrane 26 as the first wall 22 to form a larger diameter cap 24. The smaller and larger pipe ends would be inserted from the right in this particular illustration. The smaller diameter cap 22 would be centered in the larger diameter cap 24 and extend just far enough so as to accept a worm drive clamp 28. The single membrane 26 would be the stopping point for both inserted pipe ends. When a larger pipe is being capped, the smaller cap 22 would slide into the inside diameter or interior of the pipe, as it butts up against the single membrane 26. When a smaller pipe diameter is being capped, the pipe would be inserted into the smaller diameter cap 22 and butt up against the same single membrane 26. The material and fasteners would be that of the embodiment described in FIG. 1.

With reference to FIG. 11, this dual sized cap 16 embodiment is that of FIG. 10 with the exception of the filler and drain fitting 38 or 46 which is described in FIGS. 6–9. FIG. 11 more clearly shows the single membrane 26 on the left and two pipe diameter end caps 22 and 24 on the right. FIG. 11 also illustrates that it would only be necessary for the filler and drainage fitting assembly 38 to be accessible from the left side, or more clearly the side with no cap openings. This particular cap 16 could be offered in several variations, with reference to FIG. 10, without a filler and drainage assembly, with reference to FIG. 11, with a M.I.P. filler and drainage assembly and with reference to FIG. 6, with an F.I.P. filler and drainage assembly. This cap 16 can also be offered in a rubber material with a worm drive clamp 28 or in a tapered or compression female thread in both brass and steel, both being reusable for many applications.

With reference to FIG. 12, a dual sized cap 18 is shown which is similar to that illustrated in FIGS. 10 and 11 in that it has a first wall 22 extending from the membrane 26 to form a first cylindrical cap of smaller diameter, and a second cylindrical wall 24 extending from the periphery of the membrane 26 so as to form a second cap of larger diameter which is concentric to the smaller cap 22. In this illustration, both pipe ends would enter from the left and butt on the single membrane 26 to the right. The smaller diameter cap 22 would be centered in the larger diameter cap 24 using the single membrane 26 as the stop for both pipe end diameters. The interior cap diameter wall 22 is a continual cylindrical diameter from the entry point of the pipe to the center membrane 26. Both walls 22 and 24 terminate flush, as shown at the left side of illustrations in FIG. 12 and FIG. 13. This particular cap 18 will be constructed of copper and a variety of plastics. This cap 18 is primarily designed to accommodate solder or solvent weld piping, as referenced in FIG. 4, and to be fastened by means of either solder weld or solvent welds.

With reference to FIG. 13, alternatively, the dual sized cap 18 has tapered F.I.P. threads 52 and is constructed of plastic, steel or brass. This dual sized cap 18 could be altered to accept a filler and drainage fitting assembly 38 or 46 located on the center of the single membrane 26. This can be accomplished by tapping a tapered F.I.P. thread through the membrane wall and screwing a tapered M.I.P. threaded pipe, fitting or valve into the F.I.P. tap and tightening.

Figure 14:
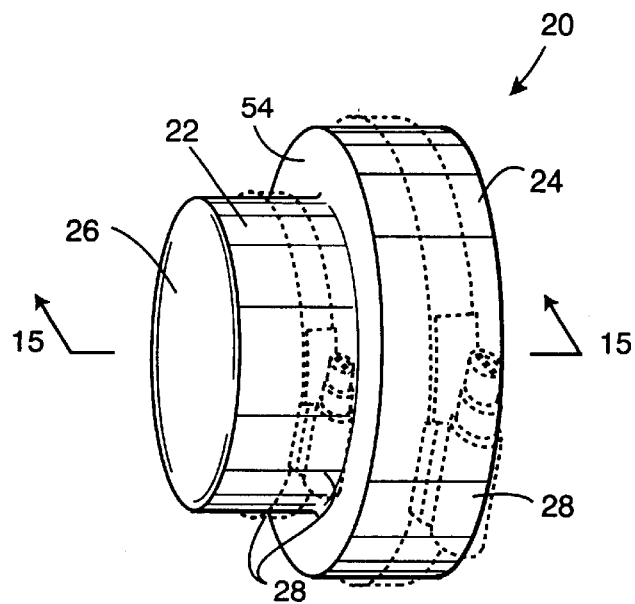
FIG. 14 is a perspective view of yet another plumbing end cap embodying the present invention, and illustrating clamps thereon in phantom.

With reference to FIG. 14, a dual sized cap 20 which is designed to accept both pipe diameters from the same side with two different termination points is illustrated. This cap 20 has a two level stepped design. The smaller diameter wall 22 steps up to the larger diameter wall 24. The butt point of the small diameter wall 22 rests on the single membrane 26 located on the far left of the illustration. The butt point of the larger diameter wall 24 rests on the ledge 54 of the step that increases the cap 20 to the next size. The dual sized cap 20 can have smooth inner surfaces, as illustrated in FIG. 17, for connection to pipes having smooth ends, or include female internal threads 56, as illustrated in FIG. 15, for attachment to tapered pipe threads or compression pipe threads.

Figure 15:
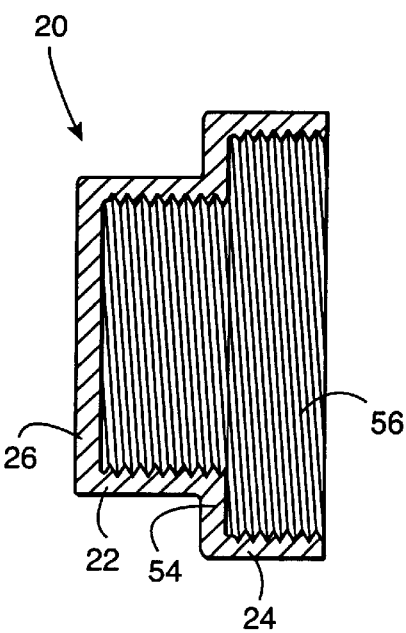
FIG. 15 is cross-sectional view taken generally along line 15—15.

The cap 20 in FIG. 14 and FIG. 15 can be manufactured in many materials, size variations and fastening variations. For example, copper, brass, steel, plastic and rubber. These caps 20 can be fastened to all of the pipe materials mentioned in the illustrated descriptions, for example, but not limited to, tapered pipe threads, compression pipe threads, solvent (glue) weld, solder weld and rubber with a worm drive clamp 28.

Figure 16:
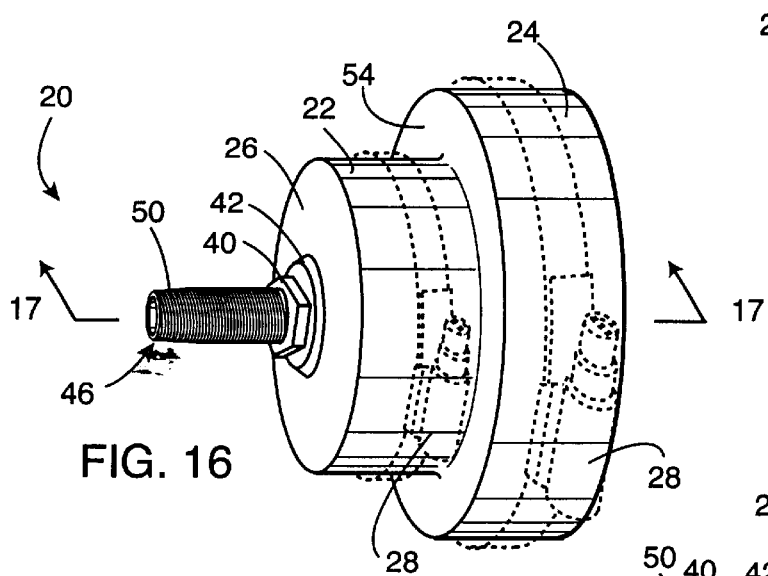
FIG. 16 is a perspective view of a plumbing end cap similar to FIG. 14, but having smooth internal surfaces, and a test fitting associated therewith.
Figure 17:
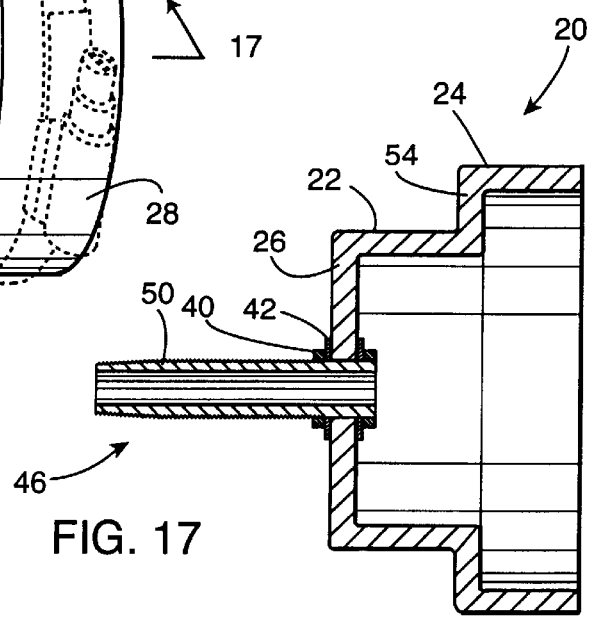
FIG. 17 is a cross-sectional view taken generally along line 17—17 of FIG. 16.

With reference to FIG. 16 and FIG. 17, a filler and drain assembly 46 is located in the center of the membrane 26. This assembly 46 is similar to that of FIG. 11. The filler and drain assembly 46 will either be molded in place and/or locked in place by the use of continual threads, lock nuts 40 and washers 42 made of plastic brass or metal. This assembly 46 can either furnish a tapered M.I.P. thread or a tapered F.I.P. thread to the installer.

In general, all the dual caps 10–20 of the present invention are efficient, convenient and practicable. They will be cost-effective due to their reusability, even in the usage of a permanent weld as the cap 10–20 can be cut from the system and the alternate remaining size used for the second application. Because the dual size cap 10–20 only covers two pipe sizes, there will be little wasted material when the cap 10–20 is used in a permanent application. They will not only condense inventories for trades' persons, at job sites, in vehicle and in shop storage, but also on retailer and wholesaler shelves and in storage facilities. They will offer the professional plumber a more diverse capping and testing product than is currently available, simplifying the process of terminating and testing piping systems. The variations of the dual sized caps 10–20 will allow for all commercially available pipe size increments and materials to be manufactured in a dual cap configuration, preferably in a sequential order, which will allow all types of contractors, not only plumbers, the convenience of these products. The dual sized caps 10–20 can also be designed to accommodate pipe sizes that will require a non-sequential order depending upon the material, wall thickness required, pipe size increments, etc. Homeowners and handy persons will also benefit. It will remove the guesswork of the untrained eye to choose from the vast quantity of similar pipe sizes commonly used. These products will be made from a variety of materials depending on their specific use, and wall thickness depending upon their purpose. They will vary in color depending on their material make-up. The color may be enhanced for ease of location on a dimly lit job situation or location or for marketing appeal.

Although several embodiments have been described in some detail for purposes of illustration, various modifications may be made without departing from the scope and spirit of the invention. Accordingly, the invention is not to be limited, except as by the appended claims.

What is claimed is:

1. A plumbing end cap, comprising:
   a fluid impervious membrane;
   a first cylindrical wall extending from the membrane and configured to envelop an end of a first pipe having a first diameter and, cooperatively with the membrane, seal the end of the first pipe; and
   a second cylindrical wall associated with the membrane having a diameter which is larger than the first cylindrical wall and configured to envelop an end of a second pipe having a second diameter and, cooperatively with the membrane, seal the end of the second pipe;

wherein the first and second walls extend from the same surface of the membrane so as to be concentric, the first wall being of a greater length than the second wall; and wherein inner surfaces of the first and second walls include protruding ridges configured to secure the first or second walls to the end of the first or second pipe.

2. The plumbing end cap of claim 1, including a test fitting extending through the membrane and being configured to securely connect to a test gauge, air source or water source.

3. The plumbing end cap of claim 1, wherein the first and second walls are comprised of a flexible material, the first or second wall being secured to the first or second pipe with a clamp surrounding an outer surface of the first or second wall.

4. The plumbing end cap of claim 1, wherein inner surfaces of the first and second walls include internal threads configured to mate with external threads of the first or second pipe.

5. A plumbing end cap, comprising:
a fluid impervious membrane;
a first cylindrical wall extending from the membrane and configured to envelop an end of a first pipe having a first diameter and, cooperatively with the membrane, seal the end of the first pipe;
a second cylindrical wall associated with the membrane having a diameter which is larger than the first cylindrical wall and configured to envelop an end of a second pipe having a second diameter and, cooperatively with the membrane, seal the end of the second pipe; and
a test fitting extending through the membrane and including internal threads to securely connect to a test gauge, air source or water source.

6. The plumbing end cap of claim 1, wherein the first and second walls are comprised of a flexible material, the first or second wall being secured to the first or second pipe with a clamp surrounding an outer surface of the first or second wall.

7. The plumbing end cap of claim 5, wherein inner surfaces of the first and second walls include protruding ridges configured to secure the first or second walls to the end of the first or second pipe.

8. The plumbing end cap of claim 5, wherein inner surfaces of the first and second walls include internal threads configured to mate with external threads of the first or second pipe.

9. The plumbing end cap of claim 5, wherein the first and second walls extend from opposite surfaces of the membrane.

10. The plumbing end cap of claim 5, wherein the first and second walls extend from the same surface of the membrane so as to be concentric.

11. The plumbing end cap of claim 10, wherein the first wall is of greater length than the second wall.

12. The plumbing end cap of claim 5, wherein the second cylindrical wall extends in stepped fashion from the first cylindrical wall.

13. A plumbing end cap, comprising:
a fluid impervious membrane;
a first flexible, cylindrical wall extending from the membrane and configured to envelop an end of a first pipe having a first diameter and, cooperatively with the membrane, seal the end of the first pipe;
a second flexible, cylindrical wall associated with the membrane having a diameter which is larger than the first cylindrical wall and configured to envelop an end of a second pipe having a second diameter and, cooperatively with the membrane, seal the end of the second pipe;
a clamp surrounding an outer surface of the first or second walls to secure the first or second wall to the respective first or second pipe; and
prongs extending from an outer surface of the first and second walls for positioning the clamp.

14. The plumbing end cap of claim 13, including a test fitting extending through the membrane and being configured to securely connect to a test gauge, air source or water source.

15. The plumbing end cap of claim 13, wherein inner surfaces of the first and second walls include protruding ridges configured to secure the first or second walls to the end of the first or second pipe.

16. The plumbing end cap of claim 13, wherein the first and second walls extend from opposite surfaces of the membrane.

17. The plumbing end cap of claim 13, wherein the first and second walls extend from the same surface of the membrane so as to be concentric, and wherein the first wall is of greater length than the second wall.

18. The plumbing end cap of claim 13, wherein the second cylindrical wall extends in stepped fashion from the first cylindrical wall.

19. A plumbing end cap, comprising:
a fluid impervious membrane;
a wall extending from the membrane in stepped fashion to define a first cylindrical wall and a second cylindrical wall of greater diameter, the first cylindrical wall being configured to accept an end of a first pipe having a first diameter and, cooperatively with the membrane, seal the end of the first pipe, the second cylindrical wall being configured to accept an end of a second pipe having a second diameter and, cooperatively with the membrane, seal the end of the second pipe; and
a test fitting extending through the membrane and being configured to securely connect to a test gauge, air source or water source.

20. The plumbing end cap of claim 19, wherein an inner surface of the first and second walls include protruding ridges configured to secure the first or second walls to the end of the first or second pipe.

21. The plumbing end cap of claim 19, wherein the inner surface of the first and second walls include internal threads configured to mate with external threads of the first or second pipe.

22. The plumbing end cap of claim 19, wherein the first and second walls are comprised of a flexible material, the first or second wall being secured to the first or second pipe with a clamp surrounding an outer surface of the first or second wall.

23. A plumbing end cap, comprising:
a fluid impervious membrane;
a first cylindrical wall extending from the membrane and configured to envelope an end of a first pipe having a first diameter, and, cooperatively with the membrane, seal the end of the first pipe; and
a second cylindrical wall extending from the membrane opposite the first cylindrical wall and having a diameter which is larger than the first cylindrical wall and configured to envelope and end of a second pipe having a second diameter which is larger than the diameter of the first pipe and, cooperatively with the membrane, seal the end of the second pipe.

24. The plumbing end cap of claim 23, including a test fitting extending through the membrane and being configured to securely connected to a test gauge, air source or water source.

25. The plumbing end cap of claim 24, wherein the test fitting extends through the membrane to allow connection to a test gauge, air source or water source on either side of the membrane.

26. The plumbing end cap of claim 23, wherein the first and second walls are comprised of a flexible material, the first or second wall being secured to the first or second pipe with a clamp surrounding an outer surface of the first or second wall.

27. A plumbing end cap, comprising:

a fluid impervious membrane;

a first cylindrical wall extending from the membrane and configured to envelop an end of a first pipe having a first diameter and, cooperatively with the membrane, seal the end of the first pipe;

a second cylindrical wall associated with the membrane having a diameter which is larger than the first cylindrical wall and configured to envelop an end of a second pipe having a second diameter and, cooperatively with the membrane, seal the end of the second pipe; and a test fitting extending through the membrane configured to securely connect to a test gauge, air source or water source;

wherein the first and second walls extend from the same surface of the membrane so as to be concentric.

28. A plumbing end cap, comprising:

a fluid impervious membrane;

a first flexible, cylindrical wall extending from the membrane and configured to envelop an end of a first pipe having a first diameter and, cooperatively with the membrane, seal the end of the first pipe;

a second flexible, cylindrical wall associated with the membrane having a diameter which is larger than first cylindrical wall and configured to envelop an end of a second pipe having a second diameter and, cooperatively with the membrane, seal the end of the second pipe; and a clamp surrounding an outer surface of the first or second walls to secure the first or second wall to the respective first or second pipe;

wherein the first and second walls extend from the same surface of the membrane so as to be concentric, and wherein the first wall is of a greater length than the second wall.

29. A plumbing end cap, comprising:

a fluid imperious membrane;

a first cylindrical wall extending from the membrane and configured to envelope an end of a first pipe having a first diameter and, cooperatively with the membrane, seal the end of the first pipe; and a second cylindrical wall extending from the same surface of the membrane and having a diameter which is larger than the first cylindrical wall so as to be concentric with the first cylindrical wall and configured to envelope an end of a second pipe having a second diameter larger than the first diameter of the first pipe and, cooperatively with the membrane, seal the end of the second pipe; and wherein the inner surfaces of the first and second walls include internal threads configured to meet with external threads of the first or second pipe.

30. The plumbing end cap of claim 29, wherein inner surfaces of the first and second walls include protruding ridges configured to secure the first or second walls to the end of the first or second pipe.

* * * * *